March 8, 1938. G. J. DE VOOYS 2,110,760
APPARATUS OF THE WET CONCENTRATION OF COAL BY THE FLOAT
AND SINK PROCESS USING A HEAVY SEPARATING LIQUID
Filed March 27, 1936 4 Sheets-Sheet 3
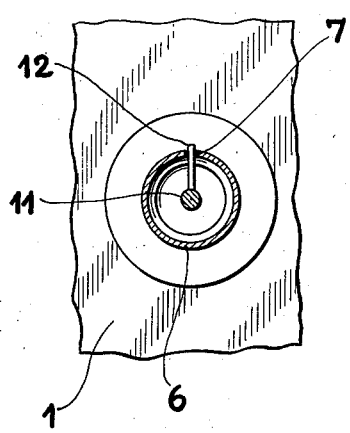
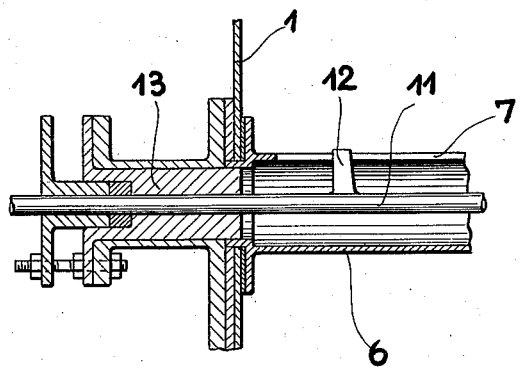
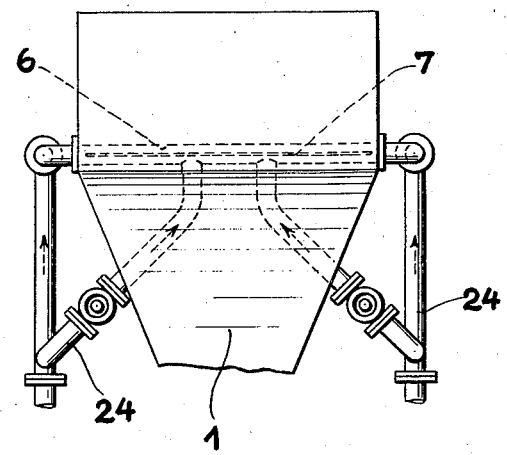

March 8, 1938.  G. J. DE VOOYS  2,110,760
APPARATUS OF THE WET CONCENTRATION OF COAL BY THE FLOAT
AND SINK PROCESS USING A HEAVY SEPARATING LIQUID
Filed March 27, 1936  4 Sheets-Sheet 4

Inventor
GERARD JAN DE VOOYS
by
Attorneys.

Patented Mar. 8, 1938

2,110,760

UNITED STATES PATENT OFFICE 2,110,760

APPARATUS FOR THE WET CONCENTRATION OF COAL BY THE FLOAT AND SINK PROCESS USING A HEAVY SEPARATING LIQUID

Gerard Jan de Vooys, Huckelhoven, near Erkelenz, Germany

Application March 27, 1936, Serial No. 71,120
In Germany June 7, 1934

3 Claims. (Cl. 209—173)

This invention relates to an apparatus for carrying out the process for separating substances of different specific gravities by means of a heavy liquid, for example, a heavy solution or a suspension of finely-ground solids in water or other relatively light liquid, such as described in the United States Patent 2,026,343, and relates to the regulation and distribution of the circulation of the heavy liquid and to other features which improve the operation. The apparatus consists of a concentrating vessel, containing the heavy liquid in which the coal is separated into a floating and a sinking material, and which in its upper part has a device for drawing off the floating material and in its lower part is in communication with the casing of a conveyor apparatus for the removal of the sinking material.

The heavy liquid has the same level in this casing as in the concentrating vessel. On the latter, at the exit for the floating material and beneath a grate, is fixed a box into which the heavy liquid drains off from the floating material. Similarly at the housing of the elevator mechanism for the sinking material is also fixed a box into which the heavy liquid from the sinking material drains. Both these box-like devices are arranged so that the heavy liquid flows out of them over weirs.

The present invention has for its object to make it possible, during working, to suitably regulate under controlled conditions the flow of the heavy liquid returning from these outlets into the concentrating vessel, both as regards strength and direction. Furthermore, by means of this improved device, there is attained a uniform distribution of the circulating liquid in the concentrating vessel.

The apparatus according to the present invention is characterized by the fact that heavy liquid flowing out of the concentrating vessel and/or the casing containing the elevator mechanism for removing the submerged residue, is returned to the concentrating vessel by one or more nozzle pipes each of which extends over the whole width of the said vessel. The nozzle discharges preferably point in a direction opposite to the inflow of the material to be treated.

In the concentrating vessel the flow of the liquid is converted or changed into an upward and/or downward current. These two kinds of current have for their object to convey, in any desired direction, the particles of coal which have approximately the same specific gravity as the heavy liquid and consequently remain suspended, or only move slowly upwards or downwards. If a particularly clean coal is desired these bordering products will be driven into the submerged residue and consequently the downward current of flow will be increased. If good gangue is desired, the upward current or flow must be increased.

These currents in the concentrating vessel may be adjusted by regulating the amount of overflow by means of independently adjustable overflow weirs on said vessel and on the elevator mechanism casing communicating therewith. According to a further feature of my invention, the overflow weirs are preferably arranged directly adjacent to each other, so that a single glance suffices to determine the ratio of the overflow. As only the ratio of the overflows to each other has any influence on the obtaining of a good separation in the concentrating vessel, the absolute overflow quantities are of no importance.

By means of one or more nozzle pipes, the heavy liquid coming from the overflow weirs is carried uniformly over the whole width of the concentrating vessel and/or preferably in a direction opposite to that of the inflow of the coal. With this arrangement the material under treatment is spread out or loosened by the opposing slight upward current, so that the treatment can act on said material more effectively. This weak upward current is then gradually changed to a horizontal direction toward the outlet, thereby avoiding the formation of eddies in the coal which floats off after the separation has begun. The outlet opening of each of the nozzle pipes may consist of a slot which extends over the whole width of the concentrating vessel. Since particles of the treated material remain is suspension in the circulating heavy liquid, there is the danger of the slots of the nozzle pipes becoming clogged. In order to obviate this defect, mechanical or hand-operated cleaning devices are arranged inside the pipes, which devices constantly keep clear the nozzle slots. The supply of the heavy liquid to the nozzle pipes preferably takes place at three or more places which are at a uniform distance from each other, so that the heavy liquid flows in and out uniformly over the whole length of the nozzle pipes.

In order to allow the flow of the heavy liquid supplied to act in the concentrating vessel in a suitable manner on the material delivered for concentration, the nozzle pipes are adjustable in the horizontal direction. The nozzle pipes may be carried in stuffing boxes, which in turn may be carried by cover plates, which fit closely round the stuffing boxes and to the sides of the concentrating vessel and which are large enough to cover the slot openings and adapted to be bolted to the side casing of the concentrating vessel, so that, when adjusted in position no leakage can occur. The nozzle pipes can be moved in the slots in a horizontal direction by suitably positioning the cover plates. It is thus possible to bring the nozzle pipes nearer to the material delivered and the currents can be caused to act upon the particles at a point nearer or farther from the feed, as may be desired. Also, the nozzle pipes are adjustably rotatable in the stuffing boxes, so that the incoming liquid can be caused to enter at any desired angle. The effects of these adjustments of the nozzle pipes are local and result in beneficial effects in the treatment, according to particular requirements. They are, however, independent of the main control of the strength of the upward and downward currents which is determined, as previously explained, by the quantities overflowing at the weirs.

The method of operation of the current is improved if the material to be treated is well wetted with the heavy liquid. A badly wetted material tends to agglomerate, so that the separation of the sinking and the floating substances is prevented. A good wetting of the material to be treated can for example be effected by thoroughly stirring the material in the heavy liquid. For this purpose, there are fitted on the inlet side of the concentrating vessel, over the whole width of the wall, pipes through which compressed air or the like is blown or brought into the liquid. The latter thereby bubbles up and the material to be treated is stirred up therein. As only a wetting of the surface of the individual grains is important, a narrow eddying zone at the inlet side of the concentrating vessel is sufficient.

The separation of the material under treatment takes place over the entire length of the vessel. It is important to provide means which will insure the carrying out of this separation without the formation of harmful or disturbing eddies and under avoidance of too strong currents.

A constructional example of the improved apparatus is shown in the annexed drawings, in which Fig. 1 is a sectional elevation of the whole device.

Figs. 3 and 4 illustrate a nozzle pipe with a cleaning device adapted for rotation.

Fig. 5 shows a nozzle pipe adapted for displacement in the vessel wall.

Fig. 6 is a section on the line 6—6 of Fig. 5.

Fig. 7 is a diagrammatic illustration of the supply of heavy liquid.

Figure 2:
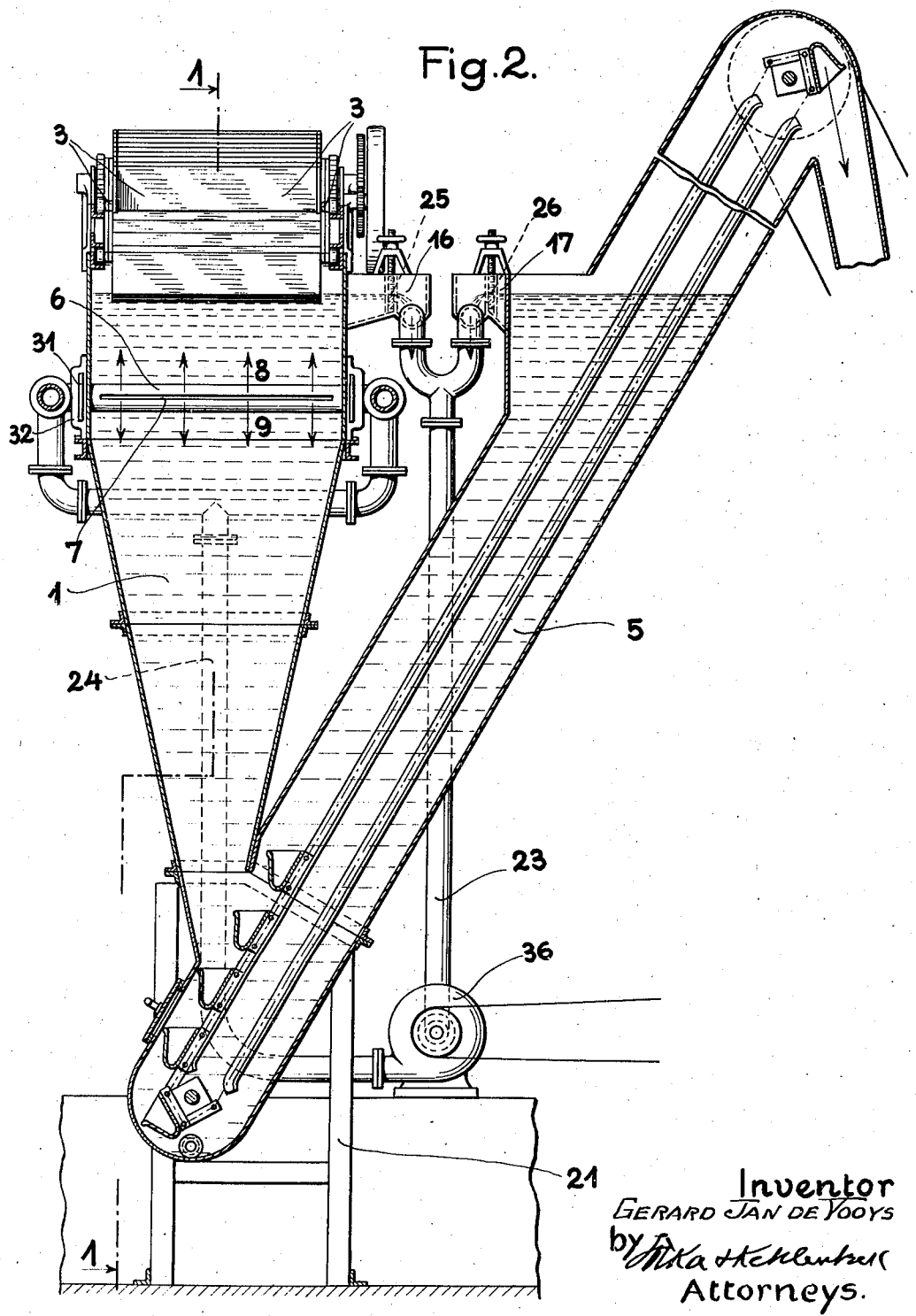
Fig. 2 is a sectional elevation along the line 2—2 of Fig. 1, showing the overflow weirs on the concentrating vessel and on the casing of the elevator mechanism for the discharge of the sinking material.

1 indicates the concentrating vessel which in the example shown is of rectangular cross-section and tapers conically towards the bottom. On to this lower part is connected a casing 5 which communicates with the said vessel. The casing contains conveyor means for carrying away the sinking material, for example, a bucket conveyor or elevator mechanism. The whole is mounted in a suitable frame 21. The material to be separated, such as coal is introduced in the direction of the arrow through a feed trough 2 or the like. The floating coal is removed by a rake conveyor 3 over the discharge slope 4 having the same width as the concentrating vessel. The submerged particles are removed by the elevator mechanism from the lower conical part of the concentrating vessel. The overflowing heavy liquid passes partly at the outlet end of the concentrating vessel into a box-like container 16 over a weir with an adjustable slide or gate 25 and/or partly at the casing of the sinking material elevator, through a box-like discharge 17 over a weir with an adjustable slide or gate 26 to the pipe 23 and a pump 36. From here the liquid is pumped through the piping 24, the nozzle pipes 6 and the slots 7 back into the concentrating vessel 1. In this manner a separation into different directions of flow is or may be effected e. g. into an ascending current 8 and a descending current 9. By raising or lowering the slides 25 and 26 an exact adjustment of the level of the liquid and thereby also a regulation of the currents 8 and 9 in the concentrating vessel is possible. The weirs, for purposes of better estimating the flow of the heavy liquid can be arranged adjacent to each other on the concentrating vessel and on the elevator mechanism casing (Fig. 2).

It will thus be seen that the strengths of the upward and the downward currents in the concentrating vessel 1 are in direct proportion to the relative quantities overflowing from the weirs at the outlets of the concentrating vessel, and that of the sinking material elevator mechanism 5.

The nozzles pipes 6 are fitted in the slots 10 made in the container wall and are movable in a horizontal direction; the slots 7 may be directed towards the inlet. The closure or seal towards the outside of the container is effected for example by a special stuffing box 13 (Fig. 4).

In Figs. 5 and 6 I have shown, by way of example, an embodiment of a nozzle pipe adjustable in a horizontal direction. The nozzle pipe 6 extends through the slot 10 of the vessel wall and has a plate 31 covering this slot and which is fitted to the vessel wall in such a manner as to form a tight seal. The slot and the nozzle pipe are closed to the outside by a curved cover plate 32 fixed on the vessel wall and into which the delivery pipe 24 opens. The pipe 6 with the plate 31 are carried slidably in the cover plate 32.

Figure 9:
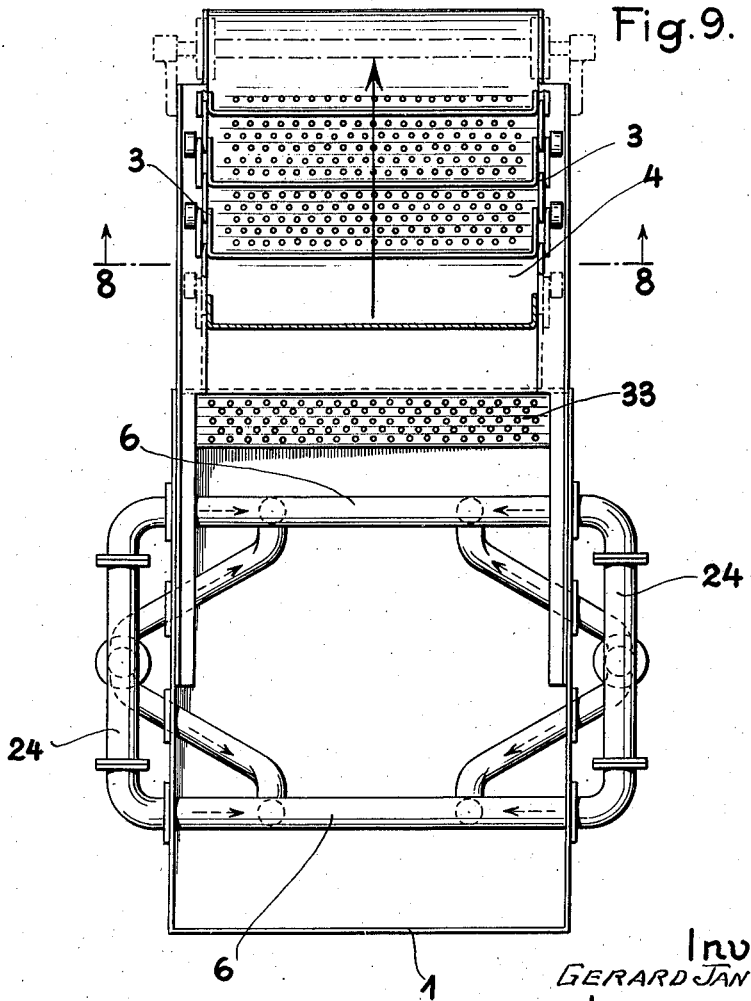
Fig. 9 is a plan of the concentrating vessel showing the discharge bucket and the endless rake conveyor.

In Figs. 3 and 4 I have shown an embodiment of a rotatable nozzle pipe 6. The arrangement of the nozzle pipe in or on the concentrating vessel is shown by way of example in Figs. 7 and 9. It will be understood that the nozzle pipes can be of any desired cross-section, for example, circular or rectangular. The slots 7 of the nozzle pipes (Figs. 3 and 4) are safeguarded against clogging by a special cleaning device. This consists of a rod 11 which carries lugs or pins 12. The rod 11 can be reciprocated backwards and forward in the longitudinal direction of the nozzle pipe.

In order to improve the working of the currents, it is important that the material to be treated should be well wetted by the heavy liquid. For this purpose there are fitted at the inlet of the concentrating vessel, tubes 19 provided with holes 20 through which compressed air or the like is brought into the heavy liquid.

Figure 1:
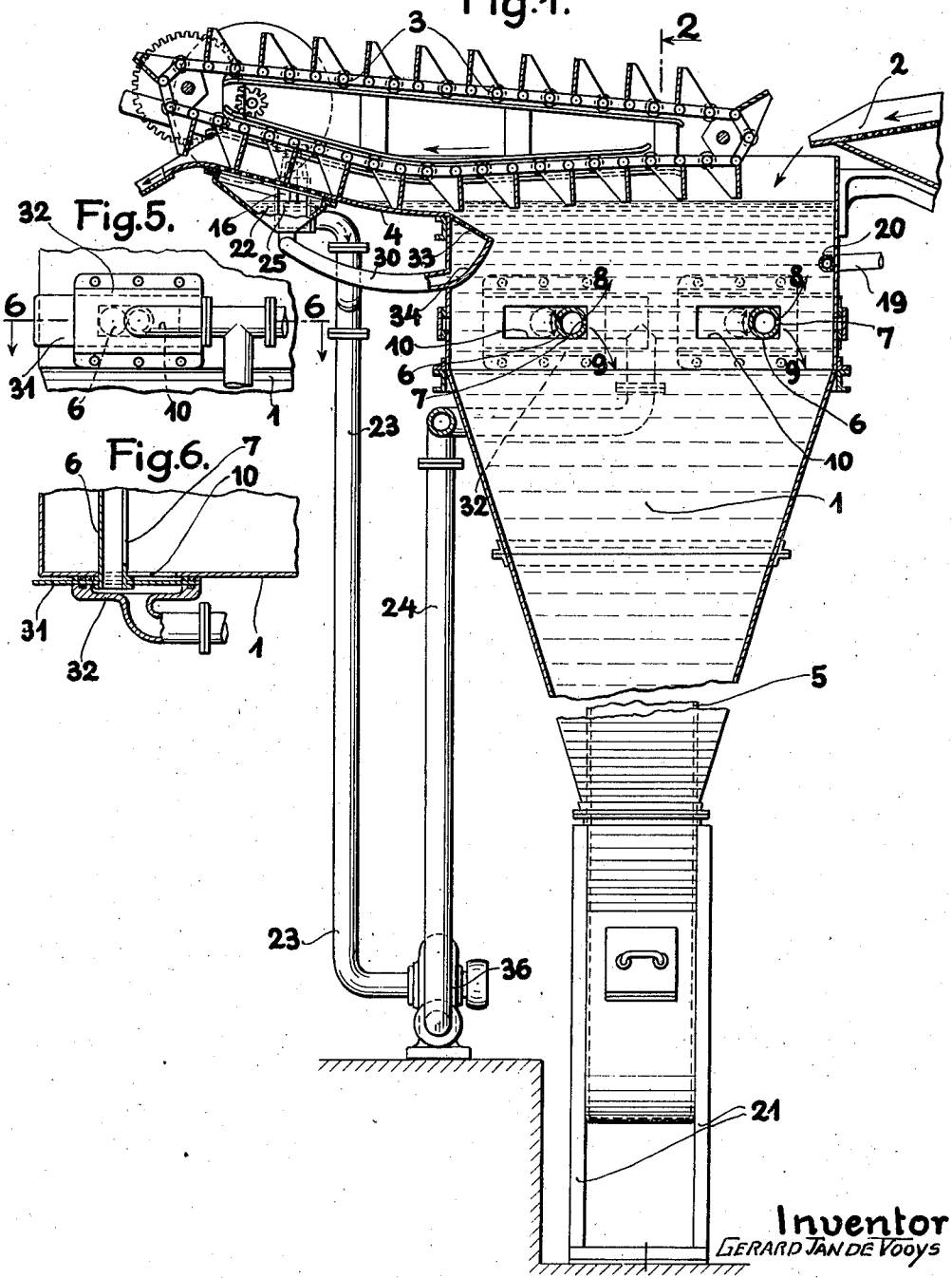

The separation takes place following on the wetting zone over the whole length of the concentrating vessel. For this purpose, the rake conveyor 3 is arranged to slide so closely against the walls of the concentrating vessel (Fig. 8) that a box-like space is formed between each two adjacent carriers in which the clean coal is brought to the discharge without harmful eddyings (Fig. 1).

In order to prevent sinking material which may be retained between the clean coal, from being discharged with this, an arrangement has been made which permits a careful loosening of the clean coal. For this purpose the box 22 into which the liquid drains from the clean coal is connected, at its lower part, by a box or tubular system 30 with the concentrating vessel 1. There is arranged in the latter, behind the inlet openings, an upwardly inclined partition 34 which deflects the current upwards. To prevent clogging of the tubes 30, there is provided a sieve 33. By this improved construction a very slow current is produced, loosening by its upward motion, the clean coal to such an extent that any confined sinking product particles can drop out. The sticking of pieces of coal between the rake conveyor and the vessel wall is also prevented by this current.

Figure 8:
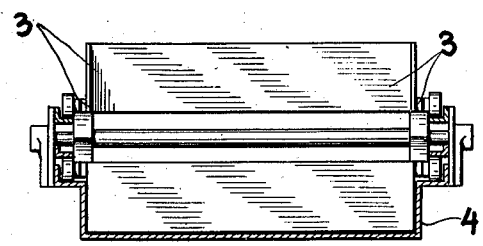
Fig. 8 is a section through the discharge bucket on the line 8—8 of Fig. 9.

As I have stated above, the discharge slope 4 has the same width as the concentrating vessel 1, and the rake conveyor 3 is arranged to slide in close contact with the walls of said vessel and therefore also with the walls of the discharge slope 4, see Fig. 8. The box-like spaces or compartments formed between adjacent bars or carriers of the conveyor 3 while such bars travel in contact with the said walls will thus be closed and separated or sealed from each other. The material in said compartments will therefore be carried along in a relatively quiescent condition, without any agitation or eddying. This is an important feature in assuring an efficient separation of the constituents, since the material under treatment should be as undisturbed as possible during the separating operation.

Another advantage of my invention resides in the fact that the conveyor 3 may be operated at relatively high speed, thus increasing the output of the separator per unit of time. This result is due partly to the close fit of the conveyor members against the walls of the receptacle 1 and particularly its discharge slope 4, and partly to the connection effected from the box 22 to the receptacle 1 directly by the conduit 30, without passing through the pump 36. It will thus be understood that the liquid dripping or overflowing into the boxes or containers 16 and 22 is divided into two portions or streams, one of which reaches the pump 36 through the pipe 23 and travels through the main circulation path, while the other is by-passed, as it were, through the conduit 30. This by-passed portion is discharged into the receptacle 1 at the upwardly inclined or curved partition 34, thereby producing a slight upward current at the upper portion of the receptacle, which current lifts the floating coal over the discharge edge of the receptacle so that such coal may not get caught or jammed between said edge and those of the traveling conveyor members. The upward current of liquid issuing from the conduit 30 (through the screen 33) also contributes to separate or drive apart the floating coal bodies, so that small particles contained between them may drop down before reaching the discharge edge of the receptacle.

I claim:—

1. An apparatus for the separation of substances of different specific gravities by the float and sink process using a heavy separating liquid, comprising a concentrating vessel provided at its upper portion with an inlet for the material to be treated and with an outlet for the liquid and the floating products, a conveyor movable in said outlet to carry away the floating products, a container communicating with said outlet to receive liquid therefrom and provided with an overflow, a pump having its intake connected with the overflow side of said container and its delivery connected with said vessel, and a connection by-passing said pump for carrying liquids from said container directly to said vessel, and means for removing the sinking product from the lower portion of said vessel.

2. An apparatus for the separation of substances of different specific gravities by the float and sink process using a heavy separating liquid, comprising a concentrating vessel provided at its upper portion with an inlet for the material to be treated and with an outlet for liquid, and means for returning to the concentraing vessel the liquid flowing out at the upper portion thereof, said means including one or more discharge pipes extending in said vessel and movable therein bodily toward and from said inlet, said pipes passing through the walls of the vessels, and covers slidable in unison with said pipes and preserving tight joints at the points where such pipes pass through the walls of the vessel.

3. An apparatus for the separation of substances of different specific gravities by the float and sink process using a heavy separating liquid, comprising a concentrating vessel provided at its upper portion with an inlet for the material to be treated and with an outlet for liquid, and means for returning to the concentrating vessel the liquid flowing out at the upper portion thereof, said means including one or more discharge pipes extending in said vessel and provided with outlet openings, said pipes being journaled to turn about their longitudinal axes so as to change the direction in which their outlet openings point.

GERARD JAN de VOOYS.